AUTOMATIC BILLET SCANNING APPARATUS

Original Filed June 3, 1963 7 Sheets-Sheet 1

INVENTOR.
JOHN S. MILLER
BY Francis J. Klempay
ATTORNEY

AUTOMATIC BILLET SCANNING APPARATUS

Original Filed June 3, 1963 7 Sheets-Sheet 2

INVENTOR.
JOHN S. MILLER
BY Francis J. Klempay
ATTORNEY

AUTOMATIC BILLET SCANNING APPARATUS

Original Filed June 3, 1963 7 Sheets-Sheet 3

INVENTOR.
JOHN S. MILLER
BY Francis J. Kleupey
ATTORNEY

AUTOMATIC BILLET SCANNING APPARATUS

Original Filed June 3, 1963 7 Sheets-Sheet 4

INVENTOR.
JOHN S. MILLER
BY Francis J. Klumpp
ATTORNEY

AUTOMATIC BILLET SCANNING APPARATUS

Original Filed June 3, 1963 7 Sheets-Sheet 5

INVENTOR.
JOHN S. MILLER
BY Francis J. Klempay
ATTORNEY

AUTOMATIC BILLET SCANNING APPARATUS

Original Filed June 3, 1963 7 Sheets-Sheet 6

INVENTOR.
JOHN S. MILLER
BY Francis J. Klempay
ATTORNEY

AUTOMATIC BILLET SCANNING APPARATUS

Original Filed June 3, 1963 7 Sheets-Sheet 7

INVENTOR.
JOHN S. MILLER
BY Francis J. Klempay
ATTORNEY

United States Patent Office

Re. 27,048
Reissued Feb. 2, 1971

27,048

AUTOMATIC BILLET SCANNING APPARATUS

John S. Miller, Poland, and John A. Toth, Highland Heights, Ohio, assignors, by mesne assignments, to Republic Steel Corporation, Cleveland, Ohio, a corporation of New Jersey Original No. 3,311,819, dated Mar. 28, 1967, Ser. No. 284,956, June 3, 1963. Application for reissue Mar. 25, 1969, Ser. No. 830,890
Int. Cl. G01r *33/12*
U.S. Cl. 324—37 6 Claims

Matter enclosed in heavy brackets [ ] appears in the original patent but forms no part of this reissue specification; matter printed in italics indicates the additions made by reissue.

*ABSTRACT OF THE DISCLOSURE*

*Billet faces are scanned by apparatus in which a flaw detector, supported for laterally reciprocating movement across a billet face, is carried on a pivoted arm movable by motor means toward and away from the billet. Arm movement is controlled so that the arm approaches a billet first at rapid speed and then at a slower speed and is maintained against the billet under pressure reduced from that used to advance it toward the billet.*

This invention relates to apparatus for automatically moving defect detecting devices across the faces of metal billets as the latter move longitudinally and in spaced succession along an inspection line in production volume and at production speeds. In the rolling of metal billets from ingots longitudinal fissures or seams sometimes develop or other imperfections may appear which cannot be removed by subsequent rolling procedures, and it is accordingly desirable in the early stages of the rolling process to detect such seams or defects and remove the same by scarfing before the billets are passed along to the subsequent finishing roll passes of the mill.

For the purpose of automatically detecting the seams or other imperfections it has heretofore been proposed to scan the outer surfaces of the billets with a magnetic flux inductor and an associated but spaced magnetic flux receptor whereby any defect appearing in the metal of the billet adjacent its outer surface will disturb the normal magnetic coupling between the unit and thus give an indication of the seam or defect. It has also been proposed to associate with such detecting means a paint spray nozzle to automatically implant on the surface of the billet an indication of the location of the defect to assist in the subsequent operation of removing the defect by scarfing or milling, for example. To be effective such detecting devices must be quite sensitive and be limited in their instantaneous reading to small areas of the outer surface of the billet, and this, of course, requires that the detecting devices have substantial travel in relation to the billets and in directions substantially normal to the longitudinal axes of the billets. The problem of effecting this relative motion is rather easily solved in the case of round billets where the billets may be rapidly rotated about their longitudinal axes as they advance longitudinally past a testing station but the requirements are rather complicated when dealing with square or rectangular billets and wherein the billets coming along the inspection line may vary from time-to-time in size and shape.

It is the primary object of the present invention to provide practical apparatus capable of sustained rugged mill service which is operative to automatically apply the magnetic defect detectors to the outer surfaces of square and rectangular billets as the billets approach the test station and to move these detecting devices across the faces of the billets in a reciprocating manner but at controlled uniform speed throughout the strokes as the billets progress longitudinally through the station. Further objects of the invention are the provision of means to automatically compensate for changes in the size and shape of the billets including an arrangement whereby the sensing devices properly ride on the surfaces of the billet even though the latter be bent and warped, means to provide for "fail-safe" operation of the apparatus, as well as for reasonably long life of the equipment, and freedom from undue maintenance.

Another object of the invention is to provide apparatus for the purpose of and having the characteristics above outlined which is wholly automatic in its operation whereby its scanning mechanism starts up only upon the appearance of a billet to be tested at the test station and which shuts down after the billet has passed through the station. In standby condition only low-wear components remain activated preparatory to the next use of the equipment.

More specific objects of the invention is the provision of equipment of the kind outlined above having means to facilitate the calibration of the defect detectors in relation to the type of steel being tested, to facilitate the inspection and maintenance of the equipment itself as well as to provide a practical arrangement for moving the equipment without danger to complex and more or less delicate mechanisms and components thereof.

The above and other objects and advantages of the invention will become apparent upon consideration of the following specification and the accompanying drawing wherein there is disclosed a preferred embodiment of the invention.

Figure 1:
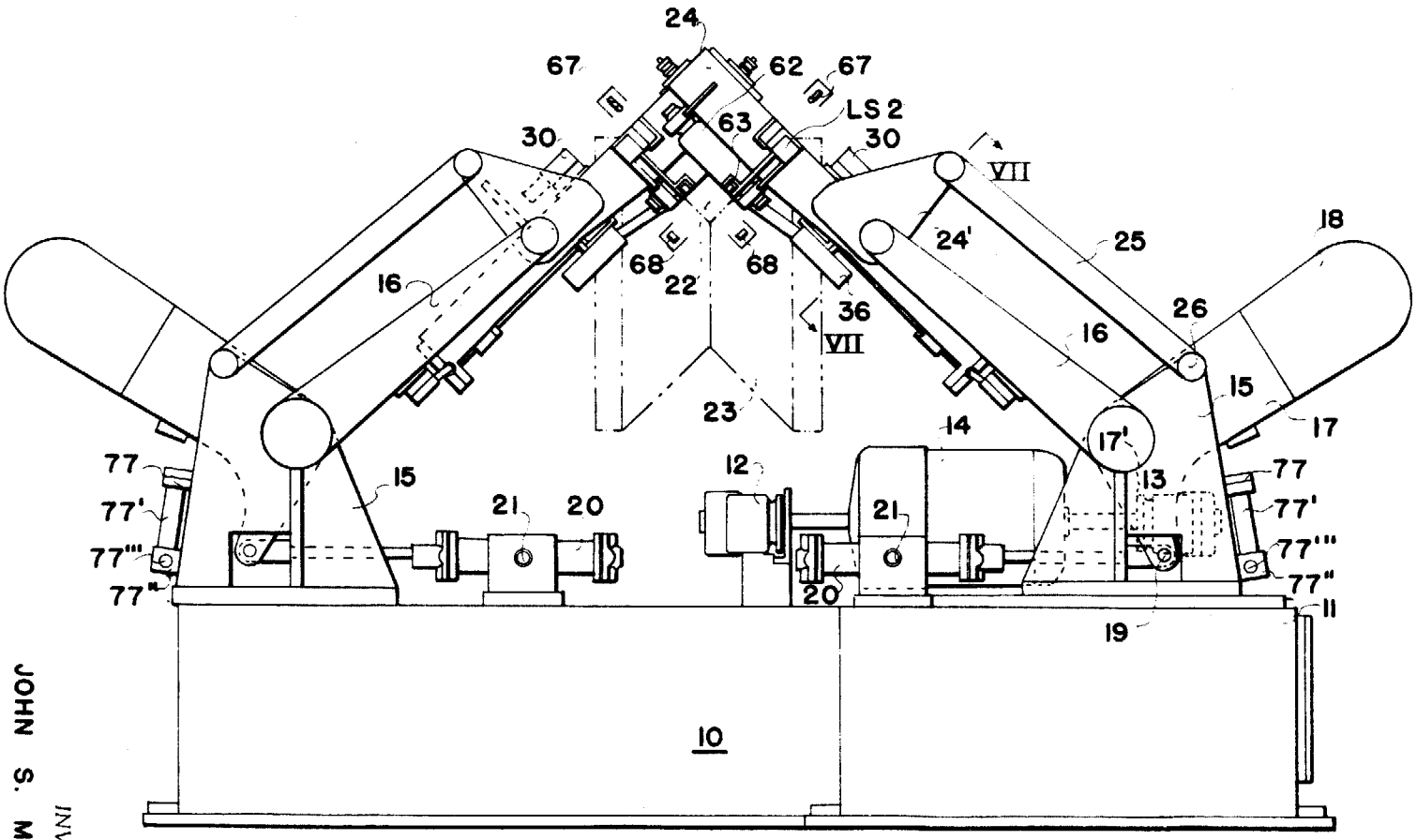
FIGURES 1 and 2 are end and side elevations, respectively, of assembled apparatus constructed in accordance with the principles of my invention.
Figure 2:
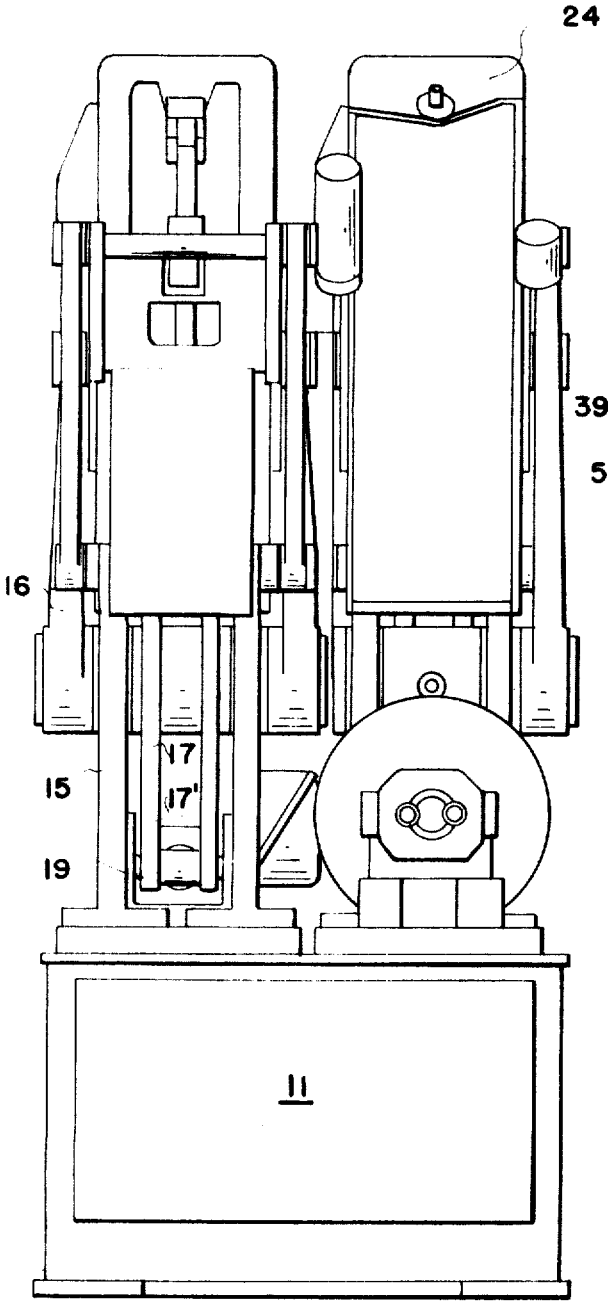
Figure 3:
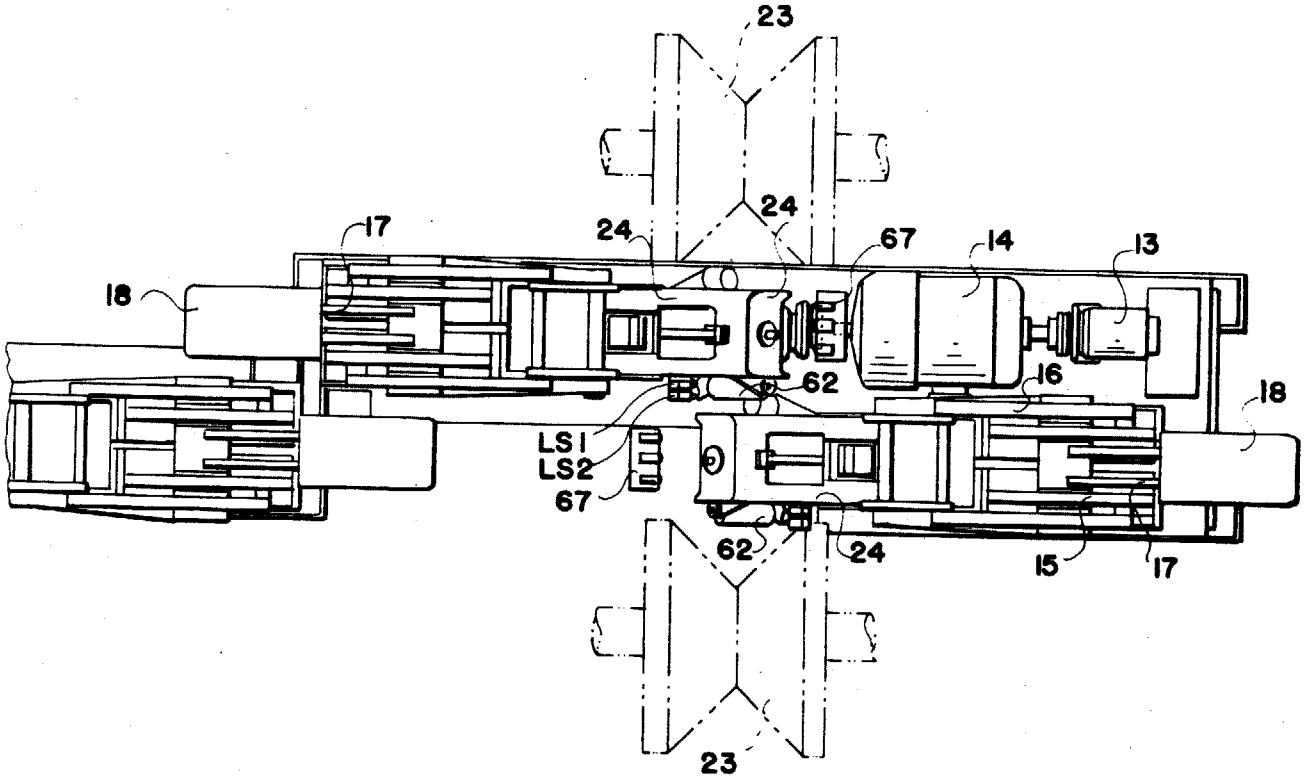
FIGURE 3 is a top view of the apparatus of FIGURES 1 and 2.

Referring to FIGURES 1–3, the mechanical apparatus of the invention comprises a base 10 in which is incorporated an oil reservoir 11 and on which is mounted a spaced pair of aligned high-pressure oil pumps 12, 13 driven by a double-ended motor 14. For a reason to be later explained, the pumps 12 and 13 are of the positive-displacement variable-volume type.

Mounted on either side of the base 10 is a bracket 15 comprised of a pair of spaced parallel and vertically disposed plates. Journalled in suitable anti-friction bearings, not shown, in the two plates of each of the brackets 15 is a shaft, also not specifically shown, to the outer free ends of which are rigidly keyed arms 16 and to the center portion of which, between the plates, are rigidly keyed arms 17 mounting at their outer free ends a counterweight 13. As is apparent from FIGURES 1 and 2, the arms 17 are in the form of bellcrank levers having downwardly extending portions 17'. Spanning the lower end portions of the extension 17' is a pin 19 connected, by means of a clevis, to the outer free end of the rod of a double-acting cylinder 20 which is mounted on the base 10 for pivotal movement about a horizontal axis 21.

By referring briefly to FIGURES 1–3, it will be apparent that aside from the common motor 14 the apparatus on either side of the machine is identical, and therefore specific reference will hereinafter be had only to one-half of the machine to avoid duplication of description. By way of introduction, however, the two arm assemblies 16 are provided primarily to carry and raise and lower two sets of scanning assemblies, one of which inspects one upper side face of a square or rectangular billet 22 being fed through the apparatus on edge while the other scanning assembly inspects the other top side face of the billet. These billets are advanced longitudinally through the apparatus by the V-shaped conveyor rolls 23 which are part of a conveying system which advances the billets at a predetermined rate of speed. As shown in FIGURE 3, the scanning assemblies on opposite sides of the apparatus are necessarily offset longitudinally with respect to each other. Both, however, are independently controlled as will become more apparent hereinafter.

Pivotally mounted on the upper free end of the arm structure 16 is an inverted T-shaped carrier 24, the upper strut 24' of which is pivotally connected to a link 25 which is generally parallel with the arm assembly 16. The other end of the link 25 is pivotally connected to the bracket 15 as at 26, and it should be obvious that there is thus provided a parallelogram type of swinging support for the carrier 24 whereby the latter may be moved up and down with a parallel motion. This permits the oscillating scanning mechanism which is carried by the housing or carrier 24 and which will now be described to always have parallel motion with the upper adjacent face of the billet 22 regardless of the cross-sectional size of the billet.

Figure 4:
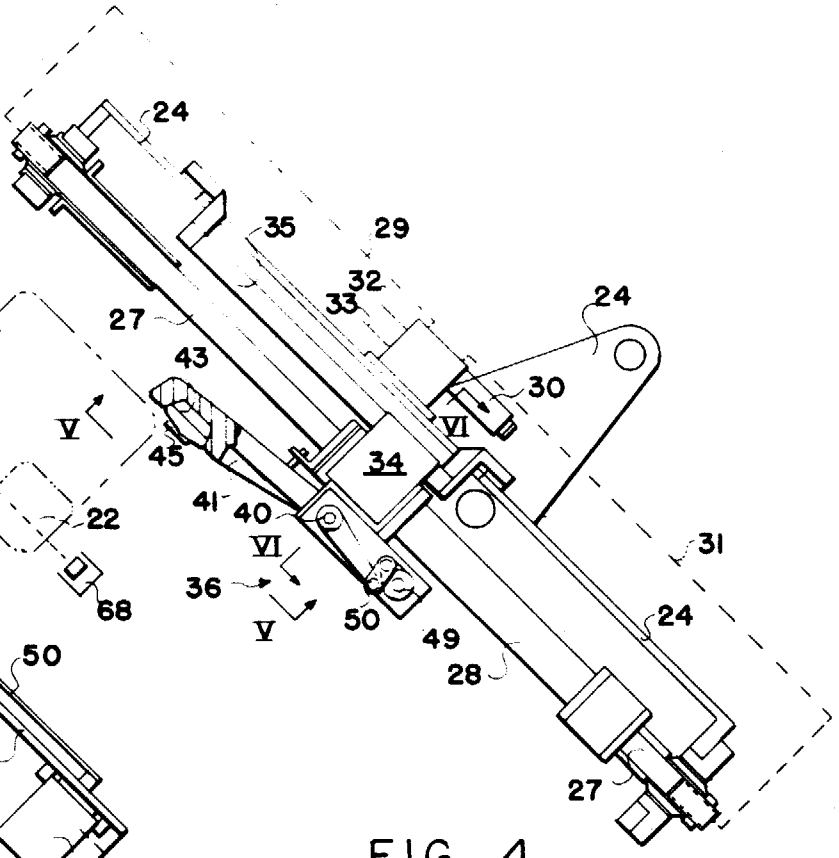
FIGURE 4 is a fragmentary side elevation of a portion of the apparatus of FIGURES 1–3.

Referring now more particularly to FIGURE 4, there is shown an elongated piston rod 27 which is suspended between opposite depending ends of the housing 24. The rod 27 carries a centrally disposed piston, not shown, which is slideably mounted a cylinder 28 having suitable packings at its ends surrounding the external cylindrical surface of the rod 27 to thereby provide, in effect, a double-acting cylinder but one in which the rod and piston are stationary while the cylinder can oscillate back and forth with respect thereto. The opposite ends of the rod 27 are hollow inwardly from the respective ends to points adjacent the nearest face of the piston so that hydraulic fluid pressure may be admitted into the cylinder on one face of the piston while fluid can be expelled from the space in the cylinder adjacent the opposite face of the piston to cause the cylinder to slide relative to the rod and piston. Thus, we provide a conduit, shown schematically at 29 leading from one open end of the rod 27 to a cylinder port of a four-way valve 30 while another conduit 31 leads from the other cylinder port of valve 30 to the other open end of rod 27. Valve 30 has a fluid supply port 32, an exhaust port 33, is solenoid operated, and is of the kind having very quick response to energization and de-energization of the solenoid. Valve 30 is internally biased so that when its solenoid is de-energized its fluid inlet 32 is connected to conduit 31 while conduit 29 is connected to exhaust 33 to thereby hold the cylinder 28 in the lower position in which it is shown in FIGURE 4. Cylinder 28 is prevented from rotating on the rod 27 by a pair of spaced plates 34 which are secured to the cylinder and which ride on opposite sides of a guide rail 35 suspended within the housing 24 in parallel relation to the rod 27.

Figure 6:
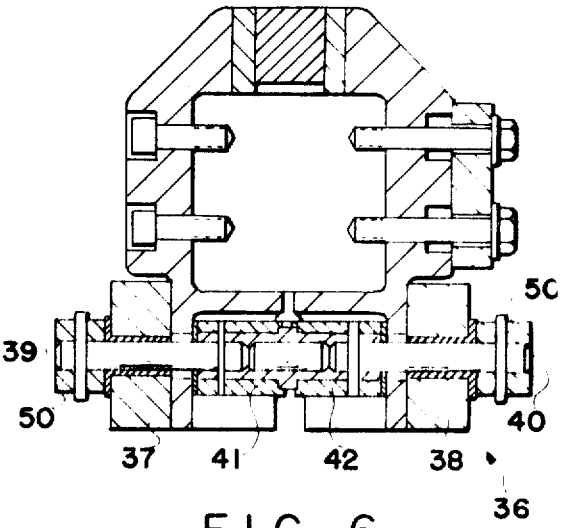
FIGURE 6 is a sectional view taken along the line VI—VI of FIGURE 4.
Figure 7:
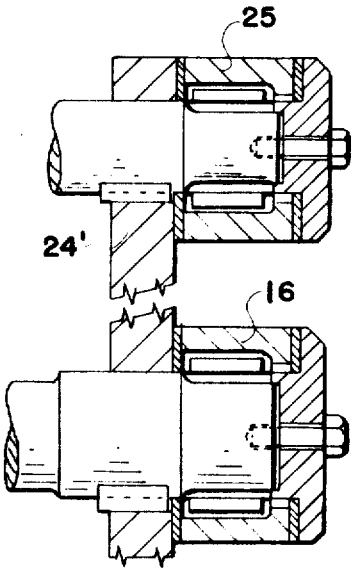
FIGURE 7 is a fragmentary sectional view taken along the line VII—VII of FIGURE 1.

Also rigidly mounted on the sliding cylinder 28 is a bracket assembly indicated generally by reference numeral 36 in FIGURE 4 and shown in sectional detail in FIGURE 6. This bracket assembly has a pair of spaced side rails 37 and 38 in which are journalled separate hinge pins 39 and 40, respectively. Keyed to these respective pins within the side rails 37, 38 is a pair of arms 41 and 42, respectively, which are partially shown in side elevation in FIGURE 4 and in bottom plan in FIGURE 5. These arms are of lightweight construction, preferably aluminum castings, and at their outer bottom faces have circular recesses 43. Concentrically disposed within these recesses and carried by rubber mounts 44 extending radially inward from the outer peripheries of the recesses are the button-like magnetic devices 45. The latter, per se, are no part of the present invention. They comprise, however, magnetic coils and core assemblies encapsulated in metal rings 46 which extend slightly below the pole faces and which are rounded and hardened for sliding movement over the faces of the billets as will be explained below. These assembled units 45, 46 are detachably secured in rings 47 which in turn are carried by the inner ends of the rubber mounts 44. It should be noted that the rubber mounts 44 are bendable in an axial direction related to the rings 47 to provide, in effect, a gimbal mounting for the magnetic devices including the wear rings 46 whereby these devices may have flat and continuous contact with the billet faces even though the latter are somewhat bent and warped.

Mounted on the inner faces of extensions of the side rails 37 and 38 of the bracket assembly 36 is a pair of small double-acting rotary air motors 48 which have outwardly directed shafts 49 each coupled by means of linkage 50 (FIGURE 4) to the pins 39 and 40. Note FIGURE 6. Motors 43 are independently energized in selected direction as will be hereinafter made apparent, and it should therefore be understood that the two arms 41 and 42 can be independently raised and lowered with respect to the bracket 36 and can be independently held down onto the face of the billet with an adjustable force determined by the pressure of the air which is furnished to the air motors 46.

Figure 5:
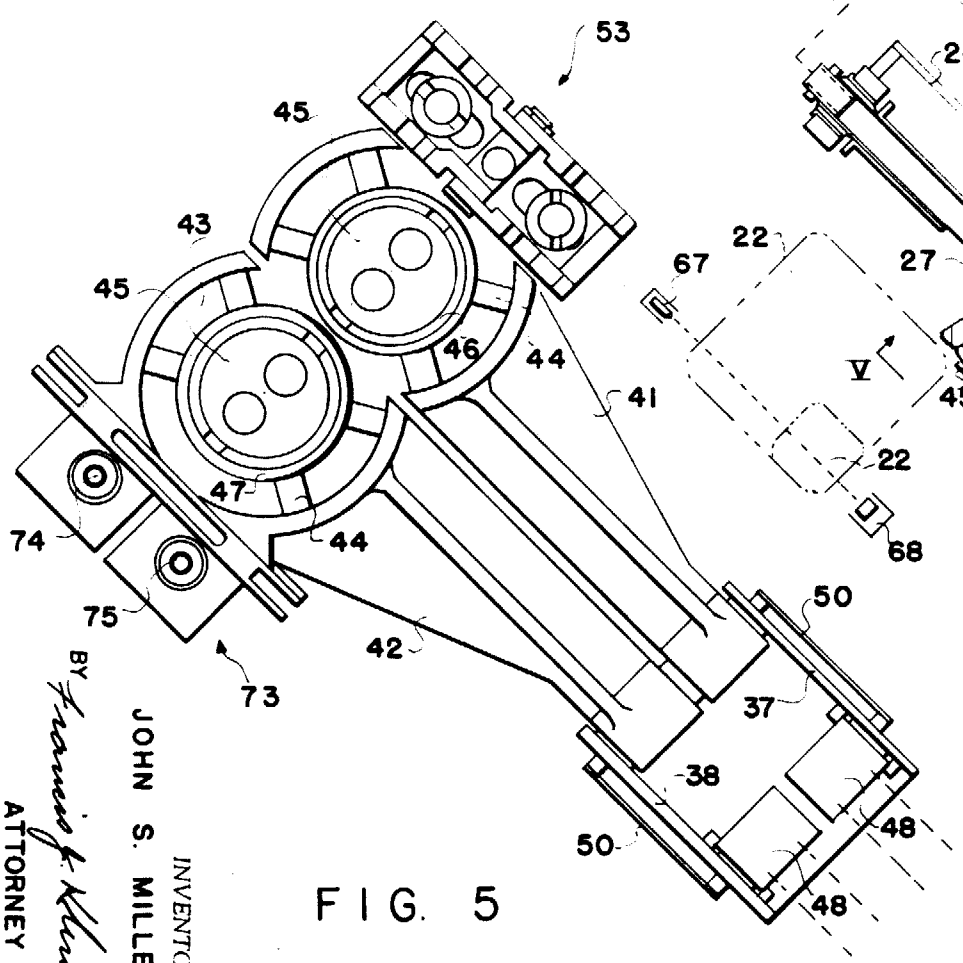
FIGURE 5 is a face view of the assembly of FIGURE 4, as viewed from the plane V—V of FIGURE 4.
Figure 8:
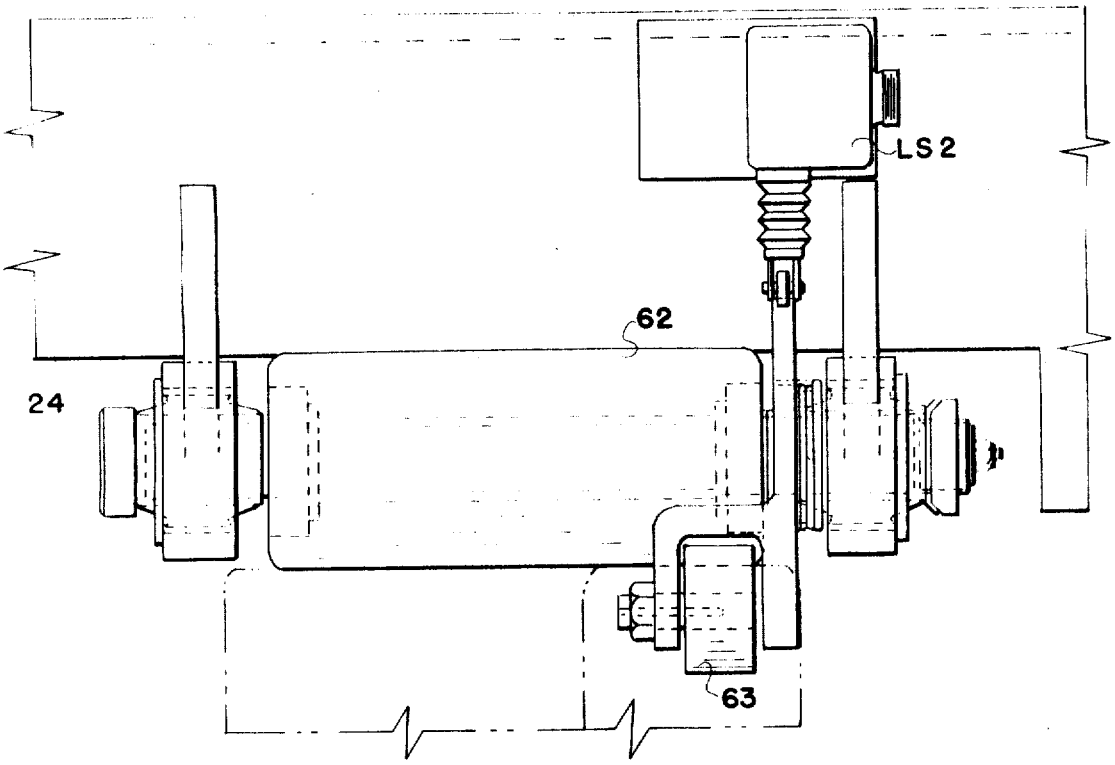
FIGURE 8 is a fragmentary end view of a portion of the apparatus of FIGURE 1.

Also carried on the bracket structure 36 by means of a forwardly disposed lever 51 pivoted thereon at 52 (see FIGURE 10) is a double shoe-type of proximity indicator indicated generally by reference numeral 53 and positioned in relation to the magnetic scanning devices for search coils 45 as shown in FIGURE 5. The assembly 53 consists of substantially identical sections which are pivoted together by a pin 54 which in turn is carried by a depending bracket from the arm 51. Each section carries a rod-like core 55 around which is wound a coil 56. In accordance with known principles, if a mass of magnetic material is brought adjacent the tip of the core the "Q" of the coil is changed, and in accordance with this invention this phenomenon is utilized to reverse the direction of actuation of the above mentioned cylinder 28 as the magnetic devices or the search coils 45 reach the end of their traverse across the face of the billet. The electronic circuit by which this is accomplished is not specifically disclosed herein but, rather, is disclosed and claimed in co-pending application Ser. No. 286,420, filed June 7, 1963, which is assigned to the assignee of the present invention.

Figure 10:
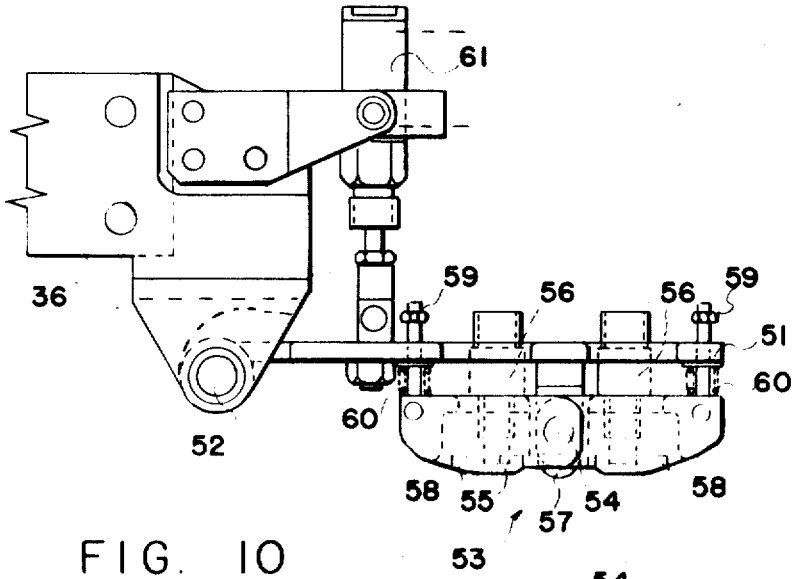
FIGURE 10 is a side elevation of a control device used in the assembly of FIGURE 1.
Figure 11:
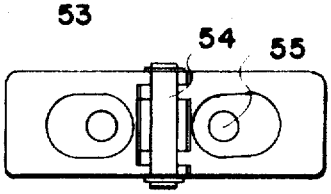
FIGURE 11 is a face view of a portion of the apparatus of FIGURE 10.

To insure that the tips of the cores 55 have uniform and consistent spacing with respect to the billet face I provide the independent pivotal mounting for the two proximity sensers utilized on each side of the machine as pointed out above. Directly underneath the pivotal connection 54 I provide a tungsten carbide ball 57 which rides on the surface of the billet to prevent undue wear on the nonmagnetic shoes 58 which surround the bottom ends of the proximity detecting cores. The outer free ends of the carriers are held against outward or downward movement by the eye bolts 59 while movement of these ends in the opposite direction is yieldingly resisted by coil springs 60. Finally, for a purpose to be later described, the supporting arm 51 is arranged to be raised and lowered by a double-acting cylinder 61 which is carried by the bracket assembly 36, as shown in FIGURE 10. This cylinder 61 also controls the pressure with which the ball 57 is held against the face of the billet.

Figure 9:
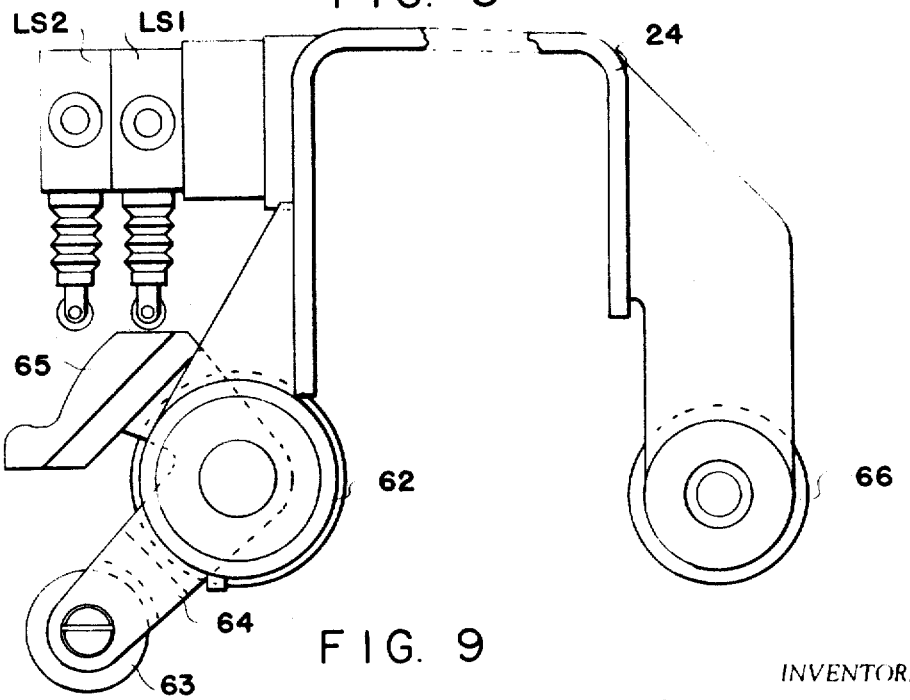
FIGURE 9 is a broken and foreshortened end view of the apparatus shown in FIGURE 8.

On the entering side of the housing 24 there is journalled a wide roll 62 adapted to ride on the billet face, and positioned ahead of this roll 62 (with respect to the direction of billet travel) is a small sensing roll 63 carried by a bellcrank arm 64 pivotally mounted on the axis of roll 63 and mounting a cam 65. See FIGURE 9. Cam 65 is arranged, upon upward movement of the sensing roll 63 relative to the housing 24, to first close a limit switch LS1 and thereafter a limit switch LS2. The function of these switches will be described in detail below. Journalled on the billet leaving side of the housing 24 is a roll 66 which is also adapted to ride on the face of the billet and to hold the housing 24 and parts carried thereby free and clear of the leaving end of the billet after the latter has been inspected.

Generally in transverse alignment with the entering sides of each of the two longitudinally offset scanning heads or housings 24 is a photocell system having a light source assembly 67 and a photocell assembly 68. In these assemblies there are three beams or channels which are spaced longitudinally along the line of travel of the billets, and the functions of these three controls will be hereinafter explained in connection with the operation of the sequencing control of the apparatus.

Figure 12:
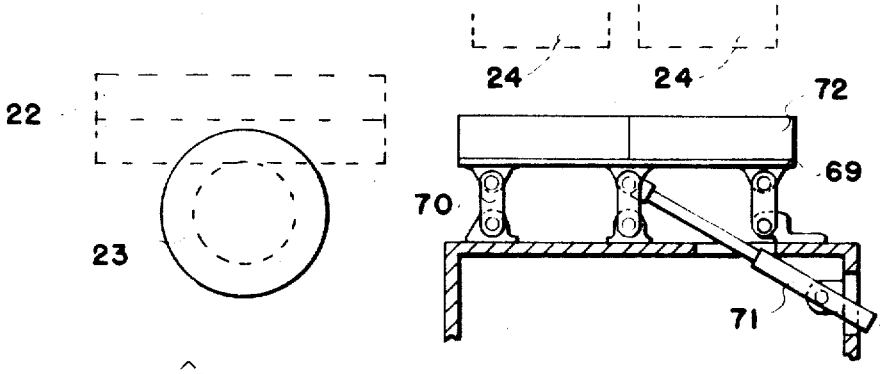
FIGURE 12 is a schematic side elevation of a retractable calibrating device used in the assembly of FIGURES 1–3.
Figure 13:
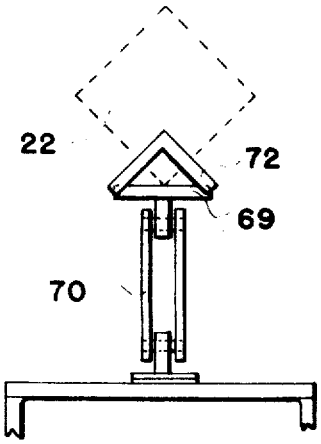
FIGURE 13 is a fragmentary end elevation of the apparatus of FIGURE 12.

Positioned centrally below the two scanning heads or housings 24 is a retracting calibrating device shown schematically in FIGURES 12 and 13 which is to be used to adjust the sensitivity of the magnetic coupling of the search coils of the scanning heads prior to the running of billets of known analysis. For this purpose I provide a carrier 69 which is pivotally mounted on the pantographic links 70 and which is arranged to be moved downwardly out of the path of travel of the billets 22 by a double-acting cylinder 71. Carrier 69 is arranged to detachably mount steel samples 72 which have faces properly oriented for scanning by the search coils at the desired rate of travel of the search coils prior to the running or feeding of the billets to be tested. The sample 72 will, of course, be the same metallurgical analysis of the billets to be tested and will be reasonably free of defects so that during the initial "dry" or calibration run of the apparatus the sensitivity or indicating point of the circuits used for measuring the magnetic coupling between the two search coils on each head may be properly adjusted in readiness for the subsequent inspection of the actual billets. The control for cylinder 71 is such that the carrier can be moved upwardly into operative position only under manual control, and suitable safety control, not shown, is used to insure that the cylinder 71 is actuated and the carrier 69 retracted prior to the infeeding of billets.

While not particularly a part of the present invention except for the manner in which the discharge nozzles are mechanically supported by and integrated with other phyiscal components, there is shown in FIGURE 5 a spray head assembly 73 which comprises two spray nozzles 74 and 75 which are carried by the arm 42 and which may be individually adjusted thereon as to position toward or away from the connecting axis of the search coils 45. When in use, there is included in the complete assembly means, not shown, to issue a spirit of marking dye or paint from one or the other of the nozzles 74, 75 in timed sequence following an indication of a defect in the billet as detected by the magnetic devices 45. An alternating valve, not shown, conditions only the trailing nozzle for operation as the scanning head slides up and down the billet, and the time delay resulting from the trailing relation compensates for the length of time required to get the spray pulse to the nozzle after reset of the signal from the inspection unit. Thus, it is possible to very accurately indicate and mark the location of any defect or fissure in the billet, however narrow the same may be.

Figure 14:
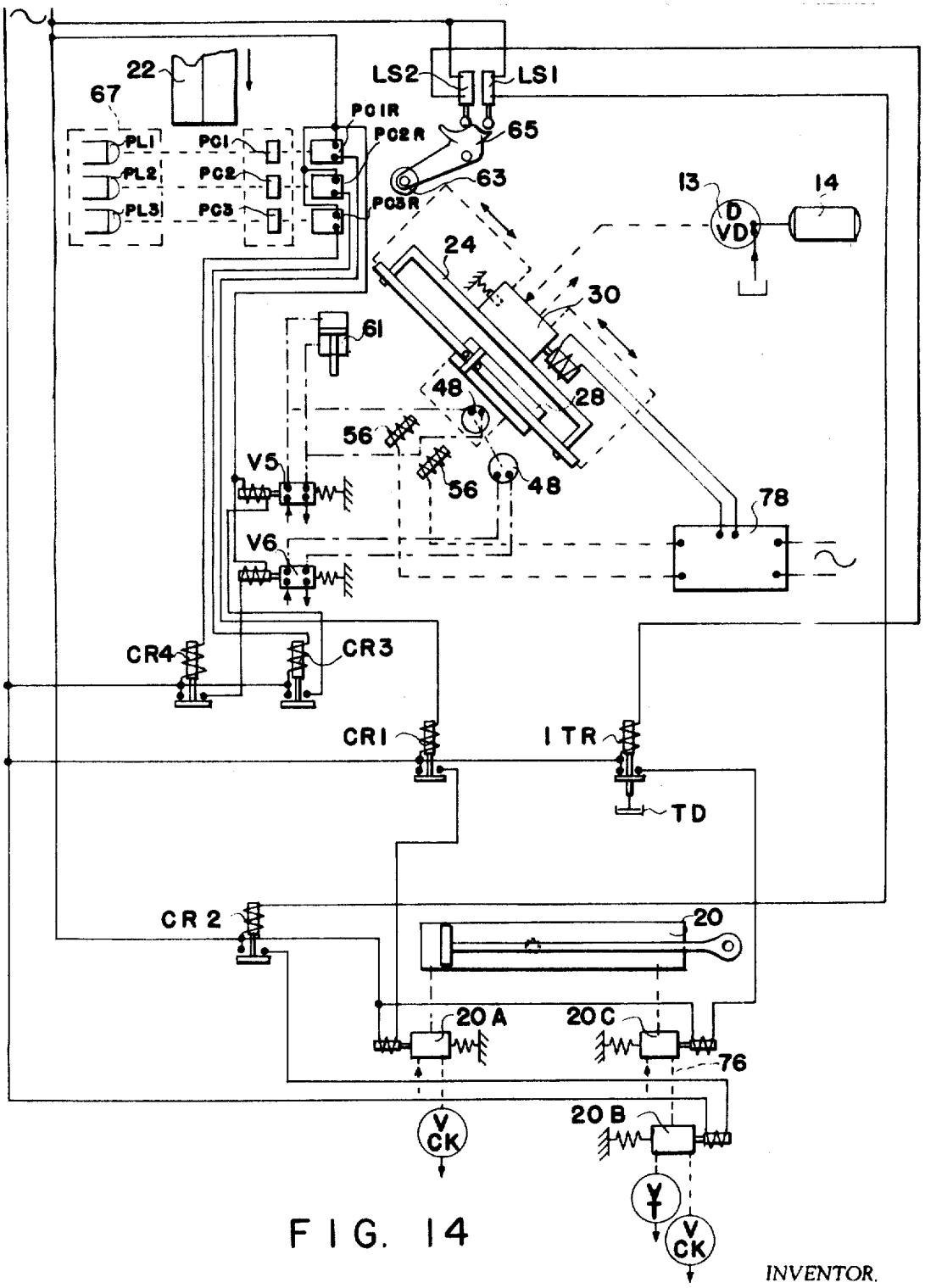
FIGURE 14 is a schematic layout of the control system used in the apparatus of FIGURES 1–3.

Referring now to FIGURE 14 of the drawing, it should be noted that the head end of the cylinder 20 (which raises and lowers the scanning head 24) is arranged to be supplied with hydraulic fluid under pressure by a solenoid-operated three-way valve 20A which is spring biased to connect this end of the cylinder to exhaust through the variable check valve shown and which when energized connects this end of the cylinder with a suitable source of hydraulic oil under pressure. A similar valve 20C is connected to the rod end of cylinder 20 and when de-energized connects this end to a conduit 76 and when energized connects this cylinder end to a suitable source of hydraulic fluid under pressure. A third similar valve 20B connects conduit 76 to exhaust through the check valve shown and when energized connects the conduits 76 to exhaust through a variable throttle or flow control valve as shown. In standby condition, all of these three valves are de-energized and the counterweight 18 holds the scanning assembly in an upper position (determined by the limiting resilient stop 77 in FIGURE 1). At this time the piston in cylinder 20 is adjacent the head end of the cylinder, and the connected check valve shown provides sufficient resistance to fluid flow to keep the valves and both ends of the cylinder full of oil.

As explained above, each of the two scanning assemblies—right and left—have three photoelectric position detectors for sensing consecutive positions of the leading end of entering billet 22, and this is more clearly shown in FIGURE 14. Thus the assembly 67 has three spaced light sources PL1, PL2, and PL3 which are directed toward three spaced photocells which are carried in the unit 63 shown in end view on FIGURE 1. The first photocell PC1 is connected into a combined detector and relay PC1R which operates upon interruption of the light beam falling on cell PC1 to establish a circuit in energization of a relay CR1. Thus, as a billet enters the scanning throat the relay CR1 is energized and through its contacts energize the solenoid valve 20A whereby oil pressure is emitted to the head end of cylinder 20 to begin the downward movement of the scanning assembly onto the billet. It should be understood that the location of this first light beam is such that as the head comes down onto the billet the latter will be engaged by the elongated roll 62 as well as by the cam actuating roller 63. Very closely after roller 63 makes such contact (which is well ahead of the contact between roll 62 and the billet) the limit switch LS1 is closed by the operating cam 65 to energize relay CR2 which, in turn, through appropriate contacts, energizes valve 20B thus blocking off the check valve and requiring all the oil being displaced out of the rod end of the cylinder 20 to discharge through the throttle valve VT. This action, of course, slows down the closing speed of the scanning head and the roll 62 so that this latter assembly bottoms onto the billet at a safe reduced speed. As this bottoming is approached, the limit switch LS2 is closed to energize a relay ITR which, in turn, energizes valve 20C to apply the oil source pressure to the rod end of cylinder 20 and thereby establish a downward holding force on the scanning head which is determined by the area differential between the head and rod ends of cylinder 20, the pressure of the hydraulic fluid applied to these opposite ends, and the effect of the counterweight 18. The object is to apply a sufficient (but not excessive) downward force on the scanning head to cause the same to ride firmly and evenly on the adjacent face of the billet regardless of the cross dimension of the billet (3" to 8" approx.).

The two proximity detectors 56 which oscillate with and immediately beside the magnetic search coils (FIGURE 5) are connected into a control assembly 78 which operates to control the energization and de-energization of the high speed four-way valve 30 which, as explained above, feeds oil alternately into the opposite ends of a cylinder 28. The control assembly 78 in general operates to hold the valve 30 de-energized when both detectors 56 are removed from a magnetic mass as in standby position, for example. The valve 30 is spring biased to normally retain hydraulic fluid pressure in the bottom end of cylinder 28 whereby this cylinder is normally retained in lower position, and when in such position the upper one of the proximity detectors 56 is within the normal projection of the bottom edge section of the adjacent face of a billet regardless of the cross dimension of the billet. As explainded above the detectors 56 are arranged to be raised and lowered by a cylinder 61, and there is provided a solenoid-operated to four-way valve V5 to control the air-energization of cylinder 61. The valve V5, when de-energized, is biased to admit air under pressure to the bottom end of cylinder 61 to thus hold the proximity detectors retracted. However, as the leading end of the advancing billet interrupts the light beam to cell PC2 a control PC2R which is similar to control PC1R establishes an energizing circuit for a relay CR3 which, when closed, energizes valve V5 to reverse the air-energization of cylinder 61 to move the proximity detectors downwardly onto the billet face. It should be understood that the proximity detectors are on the entering side of the scanning throat and that when these detectors are first brought down onto the billet face only the upper unit "sees" the metal of the billet. When this occurs, the control 78 automatically energizes the valve 30 to feed oil into the upper end of cylinder 28 while allowing oil in the bottom end to flow to exhaust. The scanning unit now moves upwardly across the face of the billet and as soon as the upper detector 56 runs off the upper edge of the face of the billet being scanned the control 78 operates to de-energize valve 30 and the cylinder 28 and the components carried and moved thereby immediately moves back to its initial starting position until the bottom detector 56 runs off the bottom edge of the face of the billet. In this manner the cylinder 28 and connected scanning units is automatically adjusted as to stroke in conformity with the width of the billet face being scanned. For example, a 3" billet will require only a 3" stroke while and 8" billet will receive an 8" stroke. By reason of the almost instantaneous response of the control 78 and the very quick action of the valve 30, the linear speed of the scanning cylinder 28 will be uniform through practically all of the scanning stroke in either direction. Further, this linear speed may be readily varied by manually adjusting the displacement of the variable delivery pump 13.

The air motor 48 which controls the arm 41 and consequently the magnetic device 45 which is adjacent the proximity detectors is connected in parallel, as to air-energization, with the cylinder 61 and consequently this search coil moves up and down with the detectors 56. Further, as stated above, the torque exerted by this motor holds this adjacent magnetic device in surface contact with the billet with a controlled force determined by the air pressure supplied. Also, when the valve V5 is de-energized the reverse air-energization of this adjacent torque motor 48 raises this adjacent magnetic device.

When the billet has approached the projection of the second magnetic device 45 (carried by arm 42) the light beam to cell PC3 is interrupted and the connected control PC3R (identical with PC2R) establishes an energizing circuit for relay CR4 which, when closed, energizes a four-way air valve V6 to admit air to the other torque motor 48 in such direction as to move the arm 42 and the magnetic device carried thereby in a downward direction causing the last mentioned device to ride on the billet face with the controlled force as determined by the pressure of the air supply. When valve V6 is de-energized it is biased in such manner as to reverse the connected motor 48 to raise arm 42 and the magnetic device 45 carried thereby away from the surface of the billet.

As the trailing end of the billet enters the scanning throat the light beam to photocell PC1 is first re-established to de-energize relay CR1 and consequently to de-energize valve 20A. Next, cell PC2 is reactivated to de-energize relay CR3 and consequently valve V5 whereby the proximity detectors rise as does also the search coil 48 adjacent thereto. Re-establishment of the light beam to cell PC3 de-energizes relay CR4 and therefore also valve V6 to raise the other search coil.

When the tail end of the billet passes roller 63 limit switches LS1 and LS2 are immediately opened, the first to de-energize relay CR2 thus de-energizing valve 20B and restore the exhaust therefrom through the check valve. Limit switch LS2 controls the relay ITR but this relay is equipped with an adjustable time delay device TD to delay the opening of the relay contacts for a predetermined time after the relay coil is de-energized. This operates to hold the valve 20C energized for a sufficient length of time to allow the fast upward retraction of the scanning head by the inflow of oil into the rod end of the cylinder 20, it being observed that the valve 20A is de-energized earlier to permit the quick outflow of the oil in the head end of cylinder 20. The head is thus rapidly retracted and it remains in retracted position by its counterweight 18. The system is thus recycled back to its initial standby condition preparatory to receiving the next billet to be inspected.

It should be noted that the counterweights 18 are sufficient to raise the scanning arms 24 well above the path of billet travel in the event of power failure and the consequent de-energization of valves 20A, 20B and 20C. I also provide an interlock, not shown, to retract the heads if the pressure of the air supply drops below that required to properly position the proximity detectors and/or the scanning coils. Also, I provide a safety relay, also not shown, or equivalent apparatus, to automatically retract the heads in the event of malfunctioning of the photocell detectors—the object being to protect the apparatus and to signal the general inoperativeness of the inspection equipment whereby possibly defective billets may not be inadvertently passed.

To facilitate inspection and maintenance of the scanning heads and transport of the assembled machine I provide an arrangement whereby the scanning heads may be retracted an abnormal extent—with the pantograph arms 16, 25 going upwardly and outwardly beyond vertical positions. This is accomplished by making the stops removable or retractable. In the specific embodiment illustrated, the stops 77 are mounted on the upper ends of pipe sections 77' which in turn are detachably received in fixed sockets 77'', being held therein by removable pins 77'''. When it is desired to so open up the machine, the pins 77''' are removed, enabling the pipe sections 77' to be also removed, and thus allowing the counterweights 18 to move far downwardly. When the parts are in the latter position, the hubs of the arms or plates 17 (see FIGURE 3) are exposed to vertical view and sling chains depending from an overhead crane may be secured about these hubs whereby the assembled machine may be safely lifted, lowered, and transported into position in plant.

In a typical plant installation two of the assembled machines shown in FIGURES 1–3 will be employed at separated stations, and suitable means, not shown, will be provided to turn the billets over after coming out of one machine so that all four faces of the billet will be properly scanned in this inspection process.

Having thus described my invention what I claim is:

[1. Apparatus for transversely scanning and magnetically inspecting a face of a longitudinally advancing metal billet, comprising a base, a carrier, an arm for mounting said carrier on said base for movement toward and away from said billet face, a scanning device mounted on said carrier for reciprocating movement across said billet face in parallel relation thereto, said scanning device containing magnetic inspection means, motor means on said carrier to reciprocate said scanning device, inductively operative edge detecting means mounted for movement with said scanning device and operable to detect the approach to either side edge of said billet face, and means controlling operation of said motor means and responsive to said edge detecting means for maintaining the reciprocable movement of said scanning device substantially equal to the transverse dimension of a billet advancing through said apparatus.]

[2. Apparatus according to claim 1 further including means carried by said carrier and connected to said scanning device to move the latter away from and toward the face of the billet, said scanning device having a shoe for riding on the surface of said face, and said means to move being operative to control the interengagement pressure between said shoe and surface.]

[3. The construction according to claim 1 wherein said arm also mounts said carrier for movement of said scanning device in close parallel relation to said billet face and further including a counterweight connected to said arm for biasing the latter and carrier to a retracted position away from the path of travel of said billet, a stop to limit biasing movement of said counterweight and subsequent retraction of said arm means and carrier, said stop being retractable so that said counterweight may move said arm and carrier still further away from the path of travel of said billet.]

4. Apparatus for transversely scanning and magnetically inspecting a face of a longitudinally advancing billet, comprising a base, a carrier, an arm for mounting said carrier on said base for movement toward and away from said billet face, a scanning device mounted on said carrier for reciprocating movement laterally across said billet face and parallel thereto, said scanning device containing magnetic inspection means, biasing means to bias said arm and carrier into a retracted standby position wherein said scanning device is free and clear of the longitudinal path of travel of billets through said apparatus, detector means to detect the approach of the leading end of a billet to a predetermined position with respect to the line of movement of said arm and carrier, motor means responsive to operation of said detector means to move said arm and carried toward the path of billet travel and to a position wherein said scanning device is in close overlying relation with a face of said billet, and means affecting operation of said motor means to impart an initial fast movement to said arm and carrier in their movement toward said billet path, and a subsequent slower movement as the scanning device on said carrier approaches the billet face.

[5. Apparatus for scanning the face of a longitudinally advancing billet, comprising a carrier mounted for movement toward a face of said billet, a support reciprocably mounted on said carrier for movement parallel to the billet face, means on said carrier to reciprocate said support, a scanning device comprising a pair of searching coils closely spaced in the direction of billet travel, each of said coils being encapsulated in a mounting having a wear-resistant shoe for riding on the face of the billet and each of said coils being carried by the outer free end of an arm pivoted on said support, and means carried by said support and connected to said arms to move said search coils toward and away from the billet face and to control interengagement pressure between said shoes and the billet face.]

[6. Apparatus for simultaneously scanning two faces of a multifaced billet and for magnetically inspecting the same, comprising a pair of arms, a carrier mounted on each of said arms for movement toward and away from a respective billet face, a scanning device mounted on each carrier for reciprocating movement transverse to a respective billet face and parallel to such face, said scanning devices containing magnetic inspection means, motor means for reciprocating respective scanning devices, said carriers being mounted in off-set relation in a direction along the longitudinal path of said billet so that one scanning device is in advance of the other and free of interference therewith, inductively operative edge detecting means mounted for movement with said scanning devices and operable to detect the approach of either side edge of the respective billet face, and means controlling operation of said motor means and responsive to said edge detecting means for maintaining the reciprocable improvement of respective scanning devices substantially equal to the transverse dimension of a respective billet face.]

[7. The construction according to claim 6 wherein said carriers are positioned on opposite sides of the path of travel of said billet.]

*8. Apparatus as set forth in claim 4 including a second arm and wherein both arms are pivotally mounted on said base below the longitudinal path of travel of said billet, one on each side thereof and are pivotally movable transversely away from the billet in upward and outward directions.*

*9. Apparatus as set forth in claim 4 including means associated with said motor means to reduce the pressure with which the arm is urged toward the billet by said motor means to control interengagement pressure between the arm and the billet.*

*10. Apparatus as set forth in claim 9 including billet sensing means carried by said arm to sense proximity of the arm to the billet during movement of the arm toward billet and to initiate control of the speed of said arm movement and interengagement pressure.*

*11. Apparatus for scanning the face of a longitudinally advancing billet comprising a base below a longitudinal path of travel of said billet, an arm pivoted to and extending upward and away from said path in a direction transversely thereof, an electromagnetic scanning device carried by said arm for relative movement transversely of said path, means to reciprocate said scanning device relative to said arm transversely of a billet moved along said path, motor means to move said arm toward said path at an initial speed and at a subsequent slower speed, means carried by said arm for sensing proximity of the arm to a billet during movement of the arm toward a billet and initiating control of said motor means to thereafter advance the arm toward the billet at a slower speed.*

*12. Apparatus as set forth in claim 11 including means associated with said motor means to reduce the pressure with which the arm is urged toward the billet by said motor means to control interengagement pressure between the arm and the billet.*

References Cited

The following references, cited by the Examiner, are of record in the patented file of this patent or the original patent.

UNITED STATES PATENTS

| | | | |
|---|---|---|---|
| 2,077,380 | 4/1937 | Drake | 324—37 |
| 2,331,418 | 10/1943 | Nolde | 324—34 |
| 2,942,178 | 6/1960 | Nerwin | 324—40 |
| 2,998,566 | 8/1961 | Cochran | 324—37 |

RUDOLPH V. ROLINEC, Primary Examiner

R. J. CORCORAN, Assistant Examiner